(12) United States Patent
Oh et al.

(10) Patent No.: US 10,979,731 B2
(45) Date of Patent: *Apr. 13, 2021

(54) APPARATUS FOR DECODING AN IMAGE

(71) Applicant: M & K Holdings Inc., Seoul (KR)

(72) Inventors: Soo Mi Oh, Gyeonggi-do (KR);
Moonock Yang, Singapore (SG)

(73) Assignee: M&K HOLDINGS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/796,555

(22) Filed: Feb. 20, 2020

(65) Prior Publication Data

US 2020/0195958 A1 Jun. 18, 2020

Related U.S. Application Data

(63) Continuation of application No. 16/260,570, filed on Jan. 29, 2019, now Pat. No. 10,602,181, which is a
(Continued)

(30) Foreign Application Priority Data

Aug. 17, 2010 (KR) .......................... 10-2010-0079530
Jun. 30, 2011 (KR) .......................... 10-2011-0064306

(51) Int. Cl.
*H04N 19/52* (2014.01)
*H04N 19/105* (2014.01)
(Continued)

(52) U.S. Cl.
CPC .......... *H04N 19/52* (2014.11); *H04N 19/105* (2014.11); *H04N 19/107* (2014.11);
(Continued)

(58) Field of Classification Search
CPC .... H04N 19/52; H04N 19/139; H04N 19/176; H04N 19/13; H04N 19/159;
(Continued)

(56) References Cited

U.S. PATENT DOCUMENTS

2003/0223495 A1* 12/2003 Sun ...................... H04N 19/197
375/240.12
2007/0098069 A1* 5/2007 Gordon ................ H04N 19/176
375/240.12
(Continued)

OTHER PUBLICATIONS

Chujoh "Description of Video Coding Technology proposal for Toshiba"; JCTVC-A117r1, Dresden, DE, Apr. 2010 (Year: 2010).*
(Continued)

*Primary Examiner* — Dramos Kalapodas
(74) *Attorney, Agent, or Firm* — Nelson Mullins Riley & Scarborough LLP; Kongsik Kim, Esq.

(57) ABSTRACT

Provided is an apparatus for decoding an image. The apparatus restores a plurality of sub-blocks by applying a scan pattern determined according to the intra prediction mode of the current block on the quantization coefficient sequence and restores the quantized transform block by applying a scan pattern determined according to the intra prediction mode of the current block on the plurality of sub-blocks. Therefore, it is possible to reduce the amount of coding bits and computing resources required to decode a current prediction block.

1 Claim, 6 Drawing Sheets

Related U.S. Application Data continuation of application No. 15/364,725, filed on Nov. 30, 2016, now Pat. No. 10,237,572, which is a continuation of application No. 13/624,864, filed on Sep. 21, 2012, now Pat. No. 9,544,611, which is a continuation of application No. PCT/KR2011/005942, filed on Aug. 12, 2011.

(51) Int. Cl.

| | | |
|---|---|---|
| *H04N 19/124* | (2014.01) | |
| *H04N 19/56* | (2014.01) | |
| *H04N 19/61* | (2014.01) | |
| *H04N 19/107* | (2014.01) | |
| *H04N 19/51* | (2014.01) | |
| *H04N 19/139* | (2014.01) | |
| *H04N 19/176* | (2014.01) | |
| *H04N 19/13* | (2014.01) | |
| *H04N 19/159* | (2014.01) | |
| *H04N 19/126* | (2014.01) | |
| *H04N 19/129* | (2014.01) | |
| *H04N 19/91* | (2014.01) | |
| *H04N 19/11* | (2014.01) | |

(52) U.S. Cl.
CPC ......... *H04N 19/124* (2014.11); *H04N 19/126* (2014.11); *H04N 19/129* (2014.11); *H04N 19/13* (2014.11); *H04N 19/139* (2014.11); *H04N 19/159* (2014.11); *H04N 19/176* (2014.11); *H04N 19/51* (2014.11); *H04N 19/56* (2014.11); *H04N 19/61* (2014.11); *H04N 19/91* (2014.11); *H04N 19/11* (2014.11)

(58) Field of Classification Search
CPC .... H04N 19/126; H04N 19/129; H04N 19/91; H04N 19/105; H04N 19/124; H04N 19/56; H04N 19/61; H04N 19/107; H04N 19/51; H04N 19/11; H04N 19/503; H04N 19/513; H04N 19/55; H04N 19/573; H04N 19/577; H04N 19/70; H04N 19/593; H04N 19/80; H04N 19/00733; H05K 999/99

See application file for complete search history.

(56) References Cited

U.S. PATENT DOCUMENTS

| | | | | |
|---|---|---|---|---|
| 2009/0003441 | A1* | 1/2009 | Sekiguchi | H04N 19/11 375/240.13 |
| 2010/0232505 | A1* | 9/2010 | Thoreau | H04N 19/105 375/240.16 |
| 2011/0243230 | A1* | 10/2011 | Liu | H04N 19/11 375/240.14 |
| 2015/0049805 | A1* | 2/2015 | Zhou | H04N 19/124 375/240.03 |

OTHER PUBLICATIONS

Chujoh; "Description of Video Coding Technology proposal for Toshiba"; JCTVC-A117r1, Dresden, DE, Apr. 2010 ( Year: 2010) (Year: 2010).*

* cited by examiner

APPARATUS FOR DECODING AN IMAGE

CROSS-REFERENCE TO RELATED APPLICATIONS

This application is a continuation application of U.S. application Ser. No. 16/260,570 filed on Jan. 29, 2019, which is a continuation application of U.S. application Ser. No. 15/364,725 filed on Nov. 30, 2016, which is a continuation application of U.S. application Ser. No. 13/624,864 filed on Sep. 21, 2012, which is a continuation application of International Application No. PCT/KR2011/005942 filed on Aug. 12, 2011, which claims priority to Korean Application No. 10-2010-0079530 filed on Aug. 17, 2010 and Korean Application No. 10-2011-0064306 filed Jun. 30, 2011. The applications are incorporated herein by reference.

TECHNICAL FIELD

The present invention relates to an apparatus for decoding an image, and more particularly, to an apparatus for decoding a current prediction unit coded in intra prediction mode.

BACKGROUND ART

In image compression methods such as Motion Picture Experts Group (MPEG)-1, MPEG-2, MPEG-4 and H.264/MPEG-4 Advanced Video Coding (AVC), one picture is divided into macroblocks to encode an image. Then, the respective macroblocks are encoded using inter prediction or intra prediction.

In inter prediction, a motion estimation is used to eliminate temporal redundancy between consecutive pictures. To detect the temporal redundancy, one or more reference pictures are used to estimate motion of a current block, and a motion compensation is performed to generate a prediction block using motion information. A block very similar to an original block is searched in a predetermine range of the reference picture. If a block similar to an original block is searched, a residual block between the original block and the prediction block and motion information are transmitted to enhance the coding efficiency.

Also, a motion vector predictor is generated using motion vectors of neighboring block, and the difference between the motion vector and the motion vector predictor is encoded to reduce the amount of coding bits required to encode the motion vector.

In H.264, the motion vector predictor is determined as a median of a left motion vector, an above motion vector and an above left motion vector. But, if a motion of the current block is different motions of the neighboring blocks, the coding efficiency of the motion vector degrades. Also, a new method of encoding a motion vector is required when the motion of image is little or steady or the image to be encoded is a background image.

SUMMARY OF THE DISCLOSURE

The present invention is directed to an apparatus for decoding an image coded in intra prediction mode.

One aspect of the present invention provides an apparatus for decoding an image in intra prediction mode, comprising: an entropy decoding unit configured to restore an intra prediction mode index, motion information and a quantization coefficient sequence, an inverse scanning unit configured to generate a quantized transform block by inversely scanning the quantized coefficient sequence in the unit of sub-block when a size of the quantized transform block is larger than a predetermined size, an inverse quantization unit configured to generate a quantization step size predictor, restore a quantization step size by adding the quantization step size predictor and a remaining quantization step size, and generate a transform block by inversely quantizing the quantized transform block using the quantization step size; an inverse transform unit configured to restore a residual block by inversely transforming the transform block, an intra prediction unit configured to restore an intra prediction mode of the current block based on the intra prediction mode index and generate a prediction block of the current block according to the intra prediction mode when the current block is coded in intra prediction mode, and an adding unit configured to generate an original block by adding the prediction block and the residual block, wherein, the inverse scanning unit restores a plurality of sub-blocks by applying a scan pattern determined according to the intra prediction mode of the current block on the quantization coefficient sequence, and restores the quantized transform block by applying a scan pattern determined according to the intra prediction mode of the current block on the plurality of sub-blocks, wherein the scan pattern for restoring the plurality of sub-blocks from the quantization coefficient sequence is the same as the scan pattern for restoring the quantized transform block from the plurality of sub-blocks, wherein, when a quantization step size of a left coding block of a current coding block and a quantization step size of an above coding block of the current coding block are unavailable, the inverse quantization unit determines a quantization step size of a previous coding block according to scan order as the quantization step size predictor of the current coding block.

Preferably, the inverse scanning unit inversely scans the quantization coefficient sequence and the plurality of sub-blocks in a reverse direction.

An apparatus according to the present invention restores a plurality of sub-blocks by applying a scan pattern determined according to the intra prediction mode of the current block on the quantization coefficient sequence and restores the quantized transform block by applying a scan pattern determined according to the intra prediction mode of the current block on the plurality of sub-blocks. Thus, encoding and decoding processes can be performed more efficiently.

DETAILED DESCRIPTION OF THE DISCLOSURE

Hereinafter, various embodiments of the present invention will be described in detail with reference to the accompanying drawings. However, the present invention is not limited to the exemplary embodiments disclosed below, but can be implemented in various types. Therefore, many other modifications and variations of the present invention are possible, and it is to be understood that within the scope of the disclosed concept, the present invention may be practiced otherwise than as has been specifically described.

A picture is divided into a plurality of slices, and each slice is divided into a plurality of largest coding units (LCUs). The position of each LCU is designated by an address indicator. The LCU may be a coding unit or may be divided into a plurality of coding units. The LCU contains information indicating structure of coding units in the LCU. One more split flags are used to indicate the structure of coding units in the LCU.

Each coding units consists of one or more prediction units. The prediction unit is a basic block for intra prediction or inter prediction. A transform unit is used for transform coding. In intra prediction, the prediction unit contains one or more transform units. In inter prediction, a transform unit may be comprised of one or more prediction units. The maximum size of the prediction unit is defined in a sequence parameter set (SPS), and the transform unit has a form of a recursive quad tree. The maximum size of the prediction unit in intra prediction may be different from that of the prediction unit in inter prediction. The maximum sizes of the prediction unit in intra prediction and inter prediction are contained the sequence parameter set.

Figure 1:
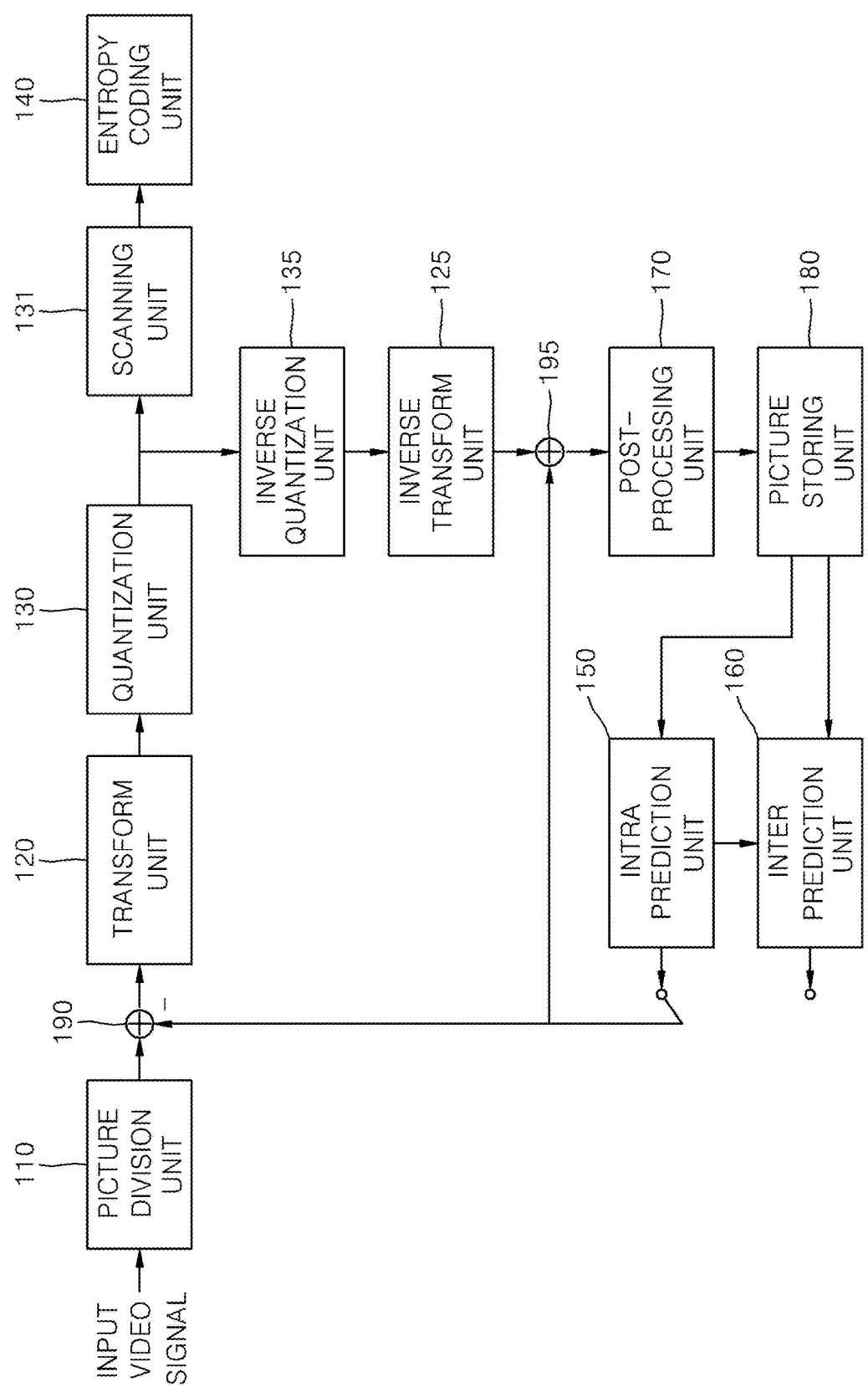
FIG. 1 is a block diagram of a moving picture coding apparatus according to the present invention.

FIG. 1 is a block diagram of a moving picture coding apparatus according to the present invention.

Referring to FIG. 1, a moving picture coding apparatus 100 according to the present invention includes a picture division unit 110, a transform unit 120, a quantization unit 130, a scanning unit 131, an entropy coding unit 140, an intra prediction unit 150, an inter prediction unit 160, an inverse quantization unit 135, an inverse transform unit 125, a post-processing unit 170, a picture storing unit 180, a subtracter 190 and an adder 195.

The picture division unit 110 analyzes an input video signal to divide each LCU of a picture into one or more coding units each of which has a predetermined size, determine prediction mode of each coding unit, and determines size of prediction unit per each coding unit. The picture division unit 110 sends the prediction unit to be encoded to the intra prediction unit 150 or the inter prediction unit 160 according to the prediction mode. Also, the picture division unit 110 sends the prediction units to be encoded to the subtracter 190.

The transform unit 120 transforms residual signals between an original block of a prediction unit and a prediction block generated by the intra prediction unit 150 or the inter prediction unit 160. The residual block may have a size of coding unit. The residual block may be divided into optimal transform units and transformed. A transform matrix type may be adaptively determined according to a prediction mode and an intra prediction mode. The transform unit of the residual signals may be transformed by horizontal and vertical one-dimensional (1D) transform matrices. In inter prediction, one predetermined transform matrix type is applied. In intra prediction, there is a high possibility that the residual signals will have vertical directivity when the intra prediction mode of the current prediction unit is horizontal. Thus, a discrete cosine transform (DCT)-based integer matrix is applied to the vertical direction, and a discrete sine transform (DST) or Karhunen Loève transform (KLT)-based integer matrix is applied to the horizontal direction. When the intra prediction mode is vertical, a DST or KLT-based integer matrix is applied to the vertical direction, and a DCT-based integer matrix is applied to the horizontal direction. Also, in intra prediction, the transform matrix may be adaptively determined according to a size of the transform units.

The quantization unit 130 determines a quantization step size for quantizing transform coefficients of the residual block. The quantization step size is determined on a coding unit having a size equal to or larger than a predetermined size. If a plurality of coding units are included in the predetermined size, the quantization step size is determined on the predetermined size. Using the determined quantization step size and a quantization matrix determined according to a prediction mode, the transform coefficients are quantized. The quantization unit 130 may determine a quantization step size of neighboring coding unit as a quantization step size predictor of the current coding unit. For example, the quantization unit 130 may determine a quantization step size of a left coding unit as a quantization step size predictor. If the left coding unit is unavailable, the quantization step size of the previous coding unit in scan order is determined as the quantization step size predictor. Alternatively, a first available quantization step size is determined as the quantization step size predictor when scanning in the order of a left coding unit, above coding unit and a previous coding unit.

The quantized transform block is provided to the inverse quantization unit 135 and the scanning unit 131.

The scanning unit 131 scans the quantized transform coefficients of the quantized transform block, thereby converting the quantized transform coefficients into 1D quantized transform coefficients. A scan pattern is determined according to the intra prediction mode and the prediction mode. The scan pattern may also be determined according to the size of the transform unit.

The scanning unit 131 determines the quantized transform block into a plurality of subsets. If the size of the transform unit is larger than a first reference size, the quantized transform block is divided into the plurality of subsets. The first reference size is 4×4 or 8×8.

The scanning unit 131 determines a scan pattern. In inter prediction, a predetermined scan pattern (for example, zigzag scan) is used. In intra prediction, the scan pattern is selected based on the intra prediction mode and the size of the transform unit. In non-directional intra prediction mode, a predetermined pattern is used. The non-directional intra prediction mode is a DC mode or a planar mode.

In directional intra prediction mode, the predetermined scan pattern is used if the size of the transform unit is equal to or larger than a predetermined size, and a scan pattern is adaptively selected based on the directional intra prediction mode if the size of the transform unit is smaller than the predetermined size. The predetermined size is 16×16.

If the size of the transform unit is smaller than the predetermined size, one of three scan patterns is used. The three scan patterns are a first scan pattern (a predetermined scan), a second scan pattern (a horizontal scan) and a third scan pattern (a vertical scan). In vertical intra prediction mode, the second scan pattern is applied because it is highly probable that the non-zero coefficients exists in the horizontal direction. In a predetermined number of directional intra prediction modes closest to the vertical intra prediction mode, the second scan pattern is applied. In horizontal intra prediction mode, the third scan pattern is applied. In the predetermined number of directional intra prediction modes closest to the horizontal intra prediction mode, the third scan pattern is applied. The predetermined number is 6 or 8.

The quantized transform coefficients are scanned in reverse direction. When the quantized transform coefficients are divided into a plurality of subsets, same scan pattern is applied to the quantized transform coefficients of each subset. The plurality of subsets consist of one main subset and one or more residual subsets. The main subset is located at an upper left side and includes a DC coefficient. The one or more residual subsets cover region other than the main subset.

Zigzag scan may be applied to scan the subsets. The subsets may be scanned beginning with the main subset to the residual subsets in a forward direction, or can be scanned in a reverse direction. A scan pattern for scanning the subsets may be set the same as a scan pattern for scanning the quantized transform coefficients. In this case, the scan pattern for scanning the subsets is determined according to the intra prediction mode. An encoder transmits information capable of indicating a position of the last non-zero quantized coefficient of the transform unit to a decoder. The encoder also transmits information capable of indicating a position of the last non-zero quantized coefficient of each subset to the decoder.

The inverse quantization unit 135 inversely quantizes the quantized transform coefficients. The inverse transform unit 125 restores residual signals of the spatial domain from the inversely quantized transform coefficients. The adder 195 generates a reconstructed block by adding the residual block reconstructed by the inverse transform unit 125 and the prediction block from the intra prediction unit 150 or the inter prediction unit 160.

The post-processing unit 170 performs a deblocking filtering process for removing blocking artifact generated in a reconstructed picture, an adaptive offset application process for complementing a difference between the reconstructed picture and the original image per pixel, and an adaptive loop filter process for complementing a difference between the reconstructed picture and the original image in a coding unit.

The deblocking filtering process may be applied to a boundary between prediction units having a predetermined size or more and between transform units. The predetermined size may be 8×8. The deblocking filtering process includes a step of determining a boundary to be filtered, a step of determining boundary filtering strength to be applied to the boundary, a step of determining whether or not to apply a deblocking filter, and a step of selecting a filter to be applied to the boundary when it is determined to apply the deblocking filter.

Whether or not to apply the deblocking filter is determined according to i) whether or not the boundary filtering strength is greater than 0 and ii) whether or not a value indicating the difference between boundary pixels of P block and Q block is smaller than a first reference value determined according to a quantization parameter.

Two or more filters may exist. When an absolute value of a difference between two pixels adjacent to the block boundary is equal to or larger than a second reference value, a weak filter is selected. The second reference value is determined by the quantization parameter and the boundary filtering strength.

The adaptive offset application process is intended to reduce a difference (distortion) between a pixel subjected to the deblocking filter and the original pixel. A picture or slice may be divided into a plurality of offset regions, and an offset mode may be determined per the offset region. There are four edge offset modes, two band offset modes and an offset non-application mode. According to each offset mode, pixels in each offset region are classified into a predetermined number of classes, and offset corresponding to the classified class is added to the pixel. In the case of an edge offset mode, a class of a current pixel is determined by comparing the current pixel value with pixel values of two or more pixels adjacent to the current pixel.

The adaptive loop filter process may be performed on the basis of a value obtained by comparing an original image and a reconstructed image to which the deblocking filtering process or the adaptive offset application process is applied. An adaptive loop filter (ALF) is detected through one Laplacian activity value on the basis of a 4×4 block. The determined ALF can be applied to all pixels included in a 4×4 block or an 8×8 block. Whether or not to apply an ALF may be determined according to coding units. A size and coefficients of a loop filter may vary according to each coding unit. Information indicating whether ALF is applied to each coding unit, filter coefficient information and filter shape information may be included in slice header and transmitted to the decoder. In the case of a chrominance signal, whether or not to apply the ALF may be determined in picture units. Unlike luminance, the loop filter may have a rectangular shape.

The adaptive loop filter process is performed on the basis of sequence or picture. The ALF filter parameter information is included in picture header or slice header. If the ALF filter parameter information is included in a picture header, the slice header does not contain the ALF filter parameter information. But, if the ALF filter parameter information is not included in the picture header, the slice header contains the ALF filter parameter information. The ALF filter parameter information includes a horizontal length and/or a vertical length of the filter for luminance components and a number of filters. If the number of filter is 2 or more, the ALF filter parameter information may contain information indicating whether the filters are encoded using prediction or not. The ALF filter parameter information includes the filter coefficients encoded predictively when the filters are encoded using prediction.

Chrominance components may also be filtered adaptively. The slice header or the picture header may include information whether each chrominance component is filtered or not. To reduce the amount of bits, the information indicating whether the Cr component is filtered and information indicating whether the Cb component is filtered may be coded jointly. A lowest index is assigned to the case that none of Cr and Cb components are not filtered because the probability that none of Cr and Cb components are not filtered is high. A highest index is assigned to the case that the both of Cr and Cb components are filtered.

The picture storing unit 180 receives post-processed image from the post-processing unit 170, and stores the image in picture units. A picture may be a frame or a field. The picture storing unit 180 has a buffer (not shown) capable of storing a plurality of pictures.

The inter prediction unit 160 performs motion estimation using one or more reference pictures stored in the picture storing unit 180, and determines one or more reference picture indexes indicating the reference pictures and one or more motion vectors. According to the reference picture index and motion vector, the inter prediction unit 160 extracts a prediction block corresponding to a prediction unit to be encoded from a reference picture selected among a plurality of reference pictures stored in the picture storing unit 180 and outputs the extracted prediction block.

The intra prediction unit 150 performs intra prediction using reconstructed reference pixels in a picture including a current prediction unit. The intra prediction unit 150 receives the current prediction unit to be predictively encoded, selects one of a predetermined number of intra prediction modes, and performs intra prediction. The predetermined number of intra prediction modes depends on a size of the current prediction unit. The intra prediction unit 150 adaptively filters reference pixels to generate the intra prediction block. When some of reference pixels are not available, it is possible to generate the reference pixels at the invalid positions using valid reference pixels.

The entropy coding unit 140 entropy-codes the quantized transform coefficients from the quantization unit 130, intra prediction information received from the intra prediction unit 150, motion information received from the inter prediction unit 160, and so on.

Meanwhile, the apparatus 100 according to the present invention predictively encodes the motion vector. The encoding procedure of the motion vector is performed by the inter prediction unit 150 and the entropy coding unit 140. The encoding procedure of the motion vector is as follows.

First, a motion vector of the current prediction unit is obtained. Available motion vectors of neighboring prediction units existing at predetermined positions are determined as spatial motion vector candidates. If the motion vector of neighboring prediction unit does not exist or the neighboring prediction unit is not included current slice, the motion vector is determined as unavailable.

Next, the spatial motion vector may be scaled adaptively. If the current prediction unit and the neighboring prediction unit have same reference picture, the motion vector candidate is not scaled. But, if the current prediction unit and the neighboring prediction unit have different reference pictures, or the temporal distances of the reference picture are not same, the motion vector candidate may be scaled using the temporal distances. The motion vector may not be scaled for a still image or background image. The number of scaling of the spatial motion vector candidate may be limited to a predetermined number.

A motion vector predictor is selected among the spatial motion vector candidates and the temporal motion vector candidate. Then the motion vector difference (MVD) between the motion vector of the current prediction unit and the motion vector predictor is obtained and encoded.

The temporal motion vector candidate is a motion vector of a block which is located at or nearby a position in one reference picture corresponding to the position of the current prediction unit. When there exist a plurality of blocks in the reference picture, one motion vector is selected as a temporal motion vector according to a predetermined method. For example, when two blocks are considered, if the motion vector of the block located at a first position is available, the motion vector is determined as the temporal motion vector candidate. But, if the motion vector of the block located at the first position is unavailable, the motion vector of a block located at a second position is determined as the temporal motion vector candidate.

In B slice, the reference picture containing the temporal motion vector candidate is derived reference picture list 0 or 1. Therefore, the list indicator indicating one reference picture list is transmitted to a decoder, and the decoder determines the reference picture containing the temporal motion vector candidate using the list indicator.

Information indicating whether the temporal motion vector candidate is used or not is included in the bit stream. Therefore, the decoding procedure of the motion vector may vary according to the information.

The spatial motion vector candidates are a left motion vector candidate and an above motion vector candidate. The left motion vector candidate is a motion vector of a left prediction unit or a motion vector of a left below prediction unit. The left motion vector candidate is a first valid motion vector encountered when retrieving the motion vectors of the left prediction unit and the left below prediction unit in a predetermined order. The above motion vector candidate is a first valid motion vector encountered when retrieving the motion vectors of an above prediction unit, an above right prediction unit and an above left prediction unit in a predetermined order.

If motion vector candidates have the same motion vectors, the motion vector candidate having large order is eliminated. If the motion vector candidate is one, the motion vector candidate is determined as motion vector predictor, and the predictor indicator indicting the motion vector predictor is not encoded.

Figure 2:
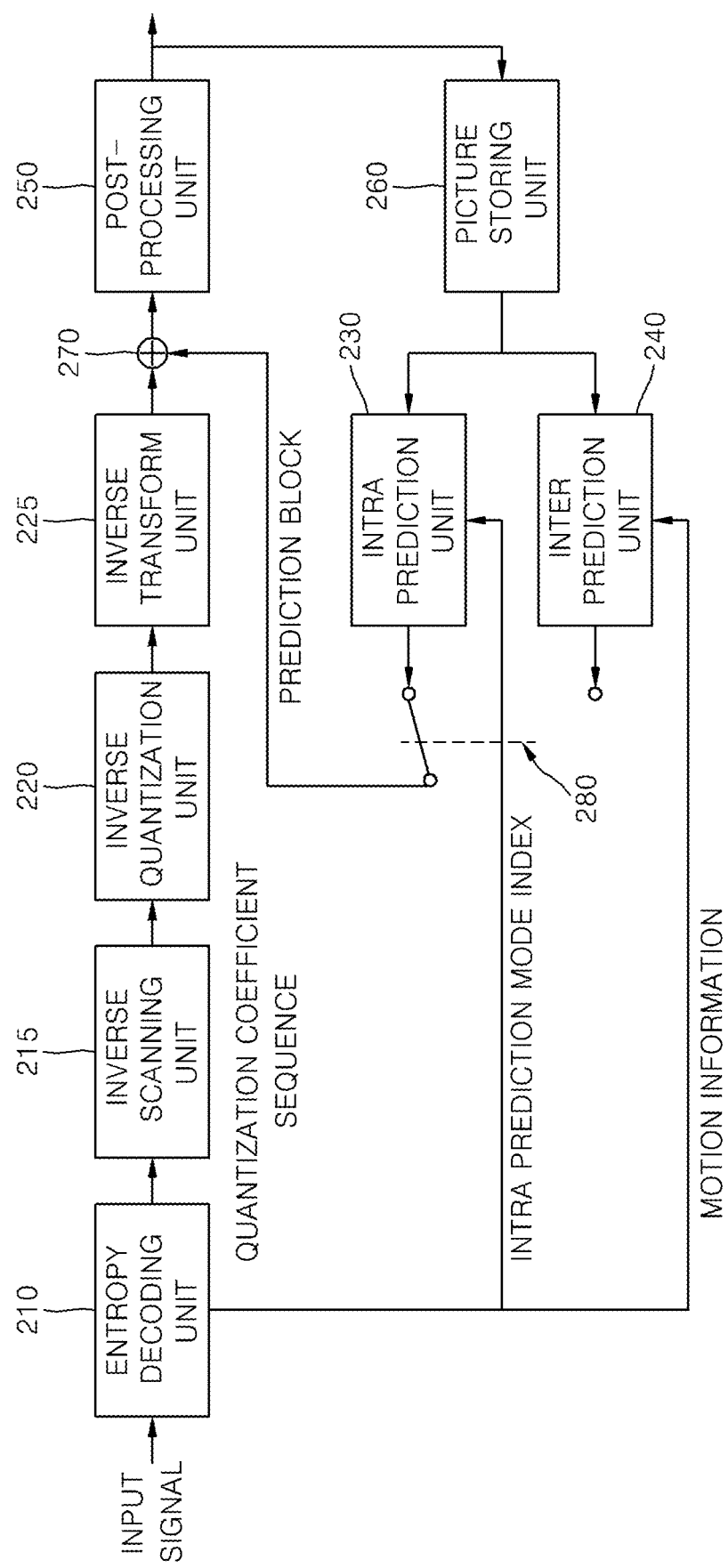
FIG. 2 is a block diagram of a moving picture decoding apparatus according to the present invention.

FIG. 2 is a block diagram of a moving picture decoding apparatus according to the present invention.

The moving picture decoding apparatus according to the present invention includes an entropy decoding unit 210, an inverse scanning unit 215, an inverse quantization unit 220, an inverse transform unit 225, an adder 270, a post-processing unit 250, a picture storing unit 260, an intra prediction unit 230, an inter prediction unit 240 and a switch 285.

The entropy decoding unit 210 extracts intra prediction information, inter prediction information and quantized coefficients information from a received bit stream. The entropy decoding unit 210 transmits the inter prediction information to the inter prediction unit 240, the intra prediction information to the intra prediction unit 230 and the inverse transform unit 225, and the quantized coefficients information to the inverse quantization unit 220 and the inverse transform unit 225.

The inverse scanning unit 215 converts the quantized coefficients information into two dimensional quantized transform block. One of a plurality of inverse scan patterns is selected for the conversion. The inverse scan pattern is selected based on the intra prediction mode. If a size of a transform unit to be decoded is larger than the predetermined reference size, the quantized transform coefficients of each subset are inversely scanned according to the selected inverse scan pattern to generate a plurality of subsets and a quantized transform block having a size of the transform unit is generated using the plurality of subsets. If the size of a transform unit to be decoded is equal to the predetermined reference size, the quantized transform coefficients of the quantized transform block are inversely scanned according to the selected inverse scan pattern to generate the quantized transform block having a size of the transform unit. The plurality of subsets consist of one main subset and one or more residual subsets. The main subset is positioned at an upper left side and includes a DC coefficient, and the one or more residual subsets cover region other than the main subset. A scan pattern to be applied to the subsets may be a zigzag scan. The subsets may be inversely scanned beginning with the main subset to the residual subsets in a forward direction, or can be scanned in the reverse direction. A scan pattern for scanning the subsets may be set the same as a scan pattern for scanning the quantized transform coefficients. The inverse scanning unit 215 performs inverse scanning procedure using information indicating a position of the last non-zero quantized coefficient of the transform unit.

In a directional intra prediction mode, the inverse scan pattern for inversely scanning the quantized transform coefficient of each subset is determined based on the directional intra prediction mode and a size of the transform unit. For example, a predetermined inverse scan pattern is used if the size of the transform unit is equal to or larger than a predetermined size, and an inverse scan pattern is adaptively selected based on the directional intra prediction mode if the size of the transform unit is smaller than the predetermined size. The predetermined size is 16×16.

If the size of the transform unit is smaller than the predetermined size, one of three inverse scan patterns is used. The three inverse scan patterns are a first scan pattern (a predetermined scan), a second scan pattern (a horizontal scan) and a third scan pattern (a vertical scan). In vertical intra prediction mode, the second scan pattern is applied because it is highly probable that the non-zero coefficients exist in the horizontal direction. In a predetermined number of directional intra prediction modes closest to the vertical intra prediction mode, the second scan pattern is applied. In horizontal intra prediction mode, the third scan pattern is applied. In the predetermined number of directional intra prediction modes closest to the horizontal intra prediction mode, the third scan pattern is applied. The predetermined number is 6 or 8.

The inverse quantization unit 220 generates a quantization step size predictor of a current coding unit. The quantization step size is determined on a coding unit having a size equal to or larger than a predetermined size. If a plurality of coding units are included in the predetermined size, the quantization step size is determined for the predetermined size. Using the determined quantization step size and a quantization matrix determined according to the prediction mode, the transform coefficients are quantized. The inverse quantization unit 220 may determine a quantization step size of neighboring coding unit as a quantization step size predictor of the current coding unit. For example, the inverse quantization unit 220 may determine the quantization step size of a left coding unit as the quantization step size predictor. If the left coding unit is unavailable, the quantization step size of the previous coding unit in scan order is determined as the quantization step size predictor. Alternatively, a first available quantization step size is determined as the quantization step size predictor when scanning in the order of a left coding unit, above coding unit and a previous coding unit.

When the quantization step size predictor is determined, the quantization step size is obtained by adding the quantization step size predictor and the received residual quantization step size. Then, the quantized transform coefficients are inversely quantized using the quantization step size and a prediction mode.

The inverse transform unit 225 inversely transforms the inverse quantized block to restore a residual block. The inverse transform matrix to be applied to the inverse quantized block is adaptively determined according to the prediction mode and the intra prediction mode. The determination procedure of the inverse transform matrix is the same as the procedure in the transform unit 120 of FIG. 1.

The adder 270 adds the restored residual block and a prediction block generated by the intra prediction unit 230 or the inter prediction unit 240 to generate a reconstructed block.

The post-processing unit 250 applies a de-blocking filter on the reconstructed image to reduce blocking artifacts resulted from the quantization.

The picture storing unit 260 stores a reconstructed picture filtered by the post-processing unit 250.

The intra prediction unit 230 restores the intra prediction mode of the current block based on the received intra prediction information, and generates a prediction block according to the restored intra prediction mode.

The inter prediction unit 240 restores reference picture indexes and motion vectors based on the received inter prediction information, and generates a prediction block using the reference picture indexes and the motion vectors. When the motion vector does not indicate a pixel position, the prediction block is generated using an interpolation filter. The inter prediction unit 240 decodes a motion vector as follows.

The inter prediction unit 240 decodes the encoded motion vector difference to generate.

Available motion vectors of neighboring prediction units existing at predetermined positions are determined as spatial motion vector candidates. If the current prediction unit and the neighboring prediction unit have same reference picture, the motion vector candidate is not scaled. But, if the current prediction unit and the neighboring prediction unit have different reference pictures, or the temporal distances of the reference picture are not same, the motion vector candidate may be scaled using the temporal distances.

A motion vector predictor is selected among the spatial motion vector candidates and the temporal motion vector candidate using information indicting motion vector predictor. Then the motion vector difference and the motion vector predictor are added to generate a motion vector of the current prediction unit.

The temporal motion vector candidate is a motion vector of the prediction unit which exists at a position or nearby the position corresponding to the position of the current prediction unit. When there exist a plurality of prediction units in the reference picture, one motion vector is selected as a temporal motion vector according to a predetermined method. For example, when there exist two prediction units, if a motion vector of the prediction unit of a first position is available, the motion vector is determined as the temporal motion vector candidate. But, if a motion vector of the prediction unit of a first position is unavailable, the motion vector of the prediction unit of the second position is determined as the temporal motion vector candidate.

In B slice, the reference picture containing the temporal motion vector candidate is derived reference picture list 0 or 1. Therefore, the list indicator indicating one reference picture list is used to determine the reference picture containing the temporal motion vector candidate.

The information indicating whether the temporal motion vector candidate is used or not is included in the bit stream. Therefore, the decoding procedure of the motion vector may vary according to the information.

The spatial motion vector candidates are a left motion vector candidate and an above motion vector candidate. The left motion vector candidate is a motion vector of a left prediction unit or a motion vector of a left below prediction unit. The left motion vector candidate is a first valid motion vector encountered when retrieving the motion vectors of the left prediction unit and the left below prediction unit in a predetermined order. The above motion vector candidate is a first valid motion vector encountered when retrieving the motion vectors of an above prediction unit, an above right prediction unit and an above left prediction unit in a predetermined order.

The switch 285 transmits a prediction block generated by the intra prediction unit 230 or a prediction block generated by the inter prediction unit 240 to the adder 270 based on the prediction mode.

A method of decoding a moving image in inter prediction mode is described. The method comprises a procedure of decoding motion information of the current prediction unit, a procedure of generating a prediction block of the current prediction unit, a procedure of restoring a residual block and a procedure of generating a reconstructed block using the prediction block and the residual block. The motion information includes motion vectors and reference picture indexes.

Figure 3:
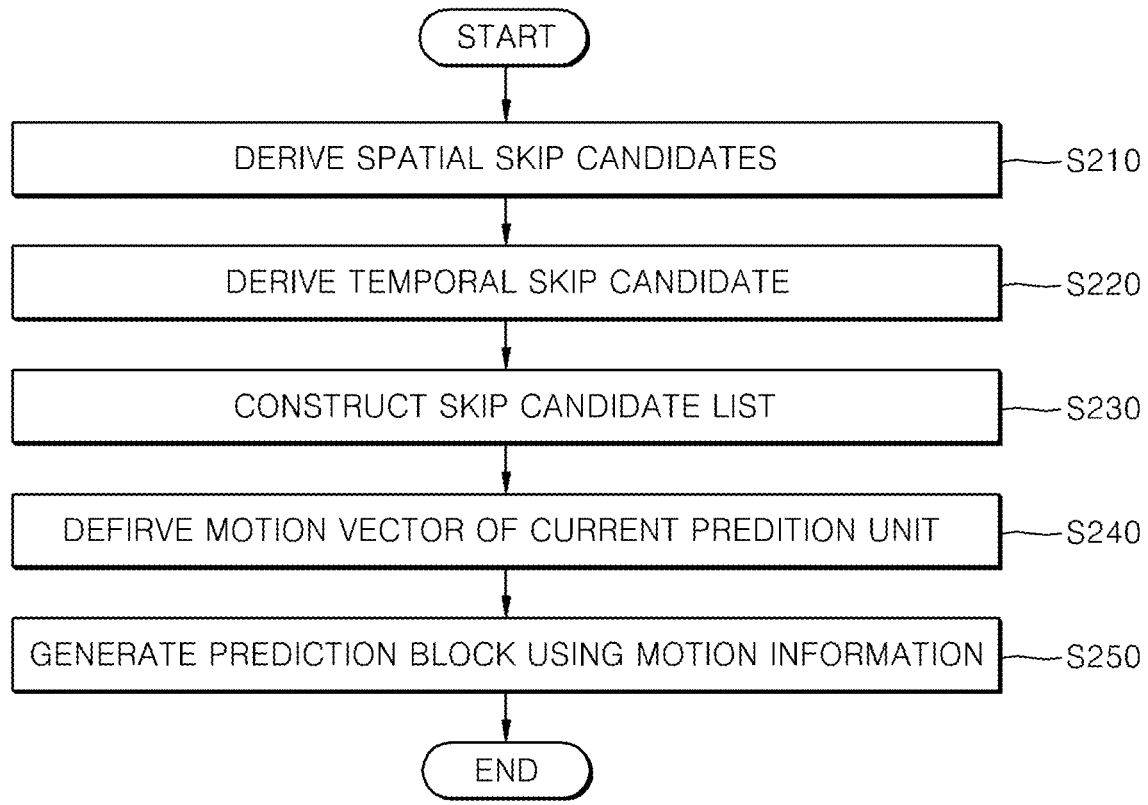
FIG. 3 is a flow chart illustrating a procedure of generating a reconstructed block of a skipped coding unit according to the present invention.

FIG. 3 is a flow chart illustrating a procedure of generating a reconstructed block of a skipped coding unit according to the present invention. When the skip_flag of the received coding unit is 1, the procedure is performed.

First, spatial skip candidates are derived from neighboring prediction units (S210).

Figure 4:
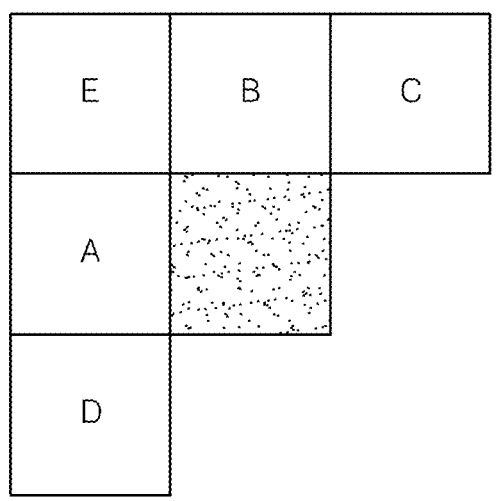
FIG. 4 is a conceptual diagram showing positions of spatial skip candidate blocks according to the present invention.

FIG. 4 is a conceptual diagram showing positions of spatial skip candidate blocks according to the present invention.

As shown in FIG. 4, a left prediction unit (block A), an above prediction unit (block B), an above right prediction unit (block C) and a left below prediction unit (block D) may be the spatial skip candidates. An above left prediction unit (block E) can be a spatial skip candidate block if one or more blocks among the blocks A, B, C and D are unavailable. The block is unavailable if the motion vector of the block is not available. The skip candidate is the information of the skip candidate block.

Alternatively, a left prediction unit (block A), an above prediction unit (block B) and a corner prediction unit may be the spatial skip candidate blocks. The corner prediction unit is a first available prediction unit encountered when retrieving the blocks C, D and E in a predetermined order.

The availability is checked on each neighboring prediction unit. If the prediction unit does not exist or the prediction mode of the prediction unit is the intra mode, the prediction unit is determined as unavailable.

When there are a plurality of left prediction units, a first available prediction unit encountered when retrieving the plurality of left prediction units in a predetermined order (for example, from top to bottom or from bottom to top) may be determined as the left prediction unit, or an uppermost left prediction unit or a lowest left prediction unit may be determined as the left prediction unit.

When there are a plurality of above prediction units, a first available prediction unit encountered when retrieving the plurality of above prediction units in a predetermined order (for example, from left to right or from right to left) may be determined as the above prediction unit, or a leftmost above prediction unit or a rightmost above prediction unit may be determined as the above prediction unit.

The temporal skip candidate is derived (S220). The step S220 comprises a step for deriving reference picture index for temporal skip candidate and a step for deriving motion vector of the temporal skip candidate.

The step for deriving reference picture index for temporal skip candidate is as follows. The reference picture index for temporal skip candidate may be set to 0. Or the reference picture index may be derived using reference picture indexes of spatially neighboring prediction units.

Figure 5:
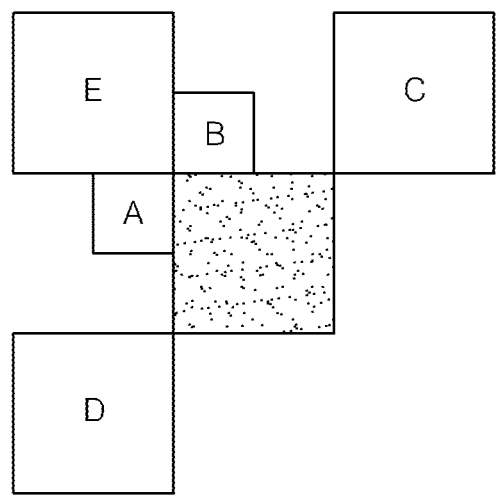
FIG. 5 is a conceptual diagram showing the positions of prediction units adjacent to a current prediction unit used to derive a reference picture index for a temporal skip candidate according to the present invention.

FIG. 5 is a conceptual diagram showing the positions of prediction units adjacent to a current prediction unit used to derive a reference picture index for a temporal skip candidate according to the present invention. The reference picture index for temporal skip candidate is one of the reference picture indexes of the neighboring prediction units.

The reference picture indexes of a left prediction unit (block A), an above prediction unit (block B), an above right prediction unit (block C), a below left prediction unit (block D) and an above right block (block E) may be used to derive the reference picture index for temporal skip candidate.

When there are a plurality of above prediction units, a first available prediction unit encountered when retrieving the plurality of above prediction units from left to right or from right to left may be determined as the above prediction unit. When there are a plurality of left prediction units, a first available prediction unit encountered when retrieving the plurality of left prediction units from top to bottom may be determined as the left prediction unit.

A reference picture index of a corner prediction unit is a reference picture index of a first available prediction unit encountered when retrieving the blocks in the order of C, D and E.

When the reference picture index of the left neighboring prediction unit (left reference picture index), the reference picture index of the above neighboring prediction unit (above reference picture index) and the reference picture index of the corner neighboring prediction unit (corner reference picture index), the reference picture index for temporal skip candidate is derived from these. Here, the only one of the blocks C, D and E is used to derive the reference picture index for temporal skip candidate. But, blocks C and D or all of the blocks C, D and E may be used to derive the reference picture index for temporal skip candidate.

The reference picture index of the highest frequency is determined as the reference picture index for temporal skip candidate. When there are a plurality of the reference picture indexes having same frequency, the lowest reference picture index is determined as the reference picture index for temporal skip candidate.

The step for deriving motion vector for a temporal skip candidate is as follows.

First, a reference picture which a temporal skip candidate block belongs to (a temporal skip candidate picture) is derived. For example, a reference picture of index 0 may be determined as the temporal skip candidate picture. A first reference picture of the reference picture list 0 is determined as the temporal skip candidate picture when the slice type is P. When the slice type is B, one reference picture list is selected using a flag of slice header indicating the temporal skip candidate picture and a first reference picture of the selected reference picture list is determined as the temporal skip candidate picture.

Alternatively, a reference picture indicated by a reference picture index for temporal skip candidate picture is determined as the temporal skip candidate picture which the temporal skip candidate block belongs to. For example, the reference picture indicated by the reference picture index for temporal skip candidate picture is determined as the temporal skip candidate picture when the slice type is P. When the slice type is B, the reference picture list is selected using the flag indicating the temporal skip candidate picture and the reference picture indicated by the reference picture index for temporal skip candidate picture is determined as the temporal skip candidate picture.

Next, a temporal skip candidate block is derived. One of a plurality of blocks corresponding to the current prediction unit is selected as the temporal skip candidate block. The plurality of blocks are located within the temporal skip candidate picture. A priority is assigned to each of the plurality of blocks. A first available block determined based on the priorities is selected as the temporal skip candidate block.

Figure 6:
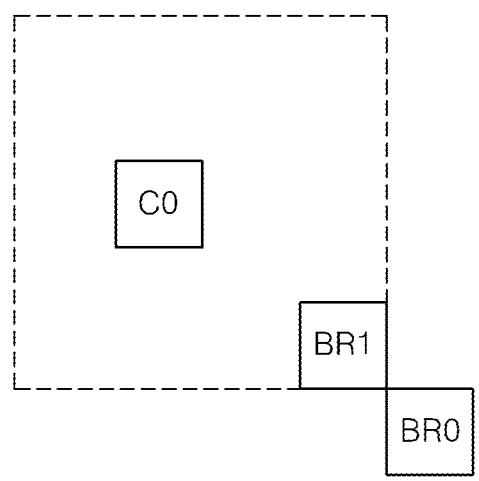
FIG. 6 is a conceptual diagram illustrating positions of blocks in a temporal skip candidate picture corresponding to a current prediction unit according to the present invention.

FIG. 6 is a conceptual diagram illustrating positions of blocks in a temporal skip candidate picture corresponding to a current prediction unit according to the present invention.

It is preferred that a position of temporal skip candidate block is different from positions of spatial skip candidate blocks.

Thus, a below right corner block (block BR0) or a lower right block (block BR1) may be a first skip candidate block. The below right corner block (block BR0) is adjacent to a block which is included in the temporal skip candidate picture and corresponds to the current prediction unit. The lower right block (block BR1) is located inside of a block which is included in the temporal skip candidate picture and corresponds to the current prediction unit. A block (block C) including an upper left pixel or a below left pixel of the center position of a block which is included in the temporal skip candidate picture and corresponds to the current prediction unit may be a second skip candidate block.

If the first skip candidate block is available, the first skip candidate block is determined as the temporal skip candidate block. If the first skip candidate block is not available and the second skip candidate block is available, the second skip candidate block is determined as the temporal skip candidate block.

Alternatively, a first available block encountered when retrieving the blocks in the order of BR0, BR1 and C may be determined as the temporal skip candidate block. Or a largest block may be determined as the temporal skip candidate block or a median value may be determined as a temporal skip candidate motion vector when there are a plurality of corresponding blocks.

When the temporal skip candidate block is determined, a motion vector of the temporal skip candidate block is set as the temporal skip candidate motion vector.

Next, a skip candidate list is constructed (S230).

The skip candidate list is constructed using available spatial and temporal skip candidates. The skip candidate list may be constructed in the order of a spatial left skip candidate (candidate A), a spatial above skip candidate (candidate B), a temporal skip candidate, a spatial above right skip candidate (candidate C) and a spatial below left skip candidate (candidate D), or in the order of a temporal skip candidate, a spatial left skip candidate (candidate A), a spatial above skip candidate (candidate B), a spatial above right skip candidate (candidate C) and a spatial below left skip candidate (candidate D).

When one or more of the candidates A, B, C, D are not available, a spatial above left skip candidate (candidate E) is added to the position of the unavailable candidate in the skip candidate list.

If a plurality of candidates have same motion information, the candidate having lower priority is deleted in the skip candidate list. The motion information includes motion vector and reference picture index.

Next, the motion vector and the reference picture index of the current prediction unit are derived (S240).

When there is a skip index in the received prediction unit, the motion vector and the reference picture index of the skip candidate indicated by the skip index are determined as the motion vector and the reference index of the current prediction unit.

When there is not a skip index in the received prediction unit and there exists a skip candidate, the motion vector and the reference picture index of the skip candidate are determined as the motion vector and the reference index of the current prediction unit.

When there is not a skip index in the received prediction unit and there does not exist at least one skip candidate, the motion vector and the reference index of the current prediction unit are set to 0.

When the skip index indicates the temporal skip candidate, the motion vector of the skip candidate block is determined as the motion vector of the current prediction unit and 0 or the reference picture index for the temporal skip candidate is determined as the reference picture index of the current prediction unit.

The skip index may have been coded using a VLC table determined by the number of the available skip candidates. If the skip index has been coded using a VLC table determined by the number of the available skip candidates, a step for counting the number of the available skip candidates and decoding the skip index using a VLC table corresponding to the number may be inserted between the steps 230 and 240. Alternatively, the number of skip candidates may be fixed. If the number of skip candidates is fixed, one or more additional skip candidates may be generated to be added the skip candidate list.

If the motion vector and the reference picture index are derived, a prediction block is generated using the reference picture index and motion vector (S250). The prediction block is a reconstructed block.

Meanwhile, a procedure of generating a reconstructed block performed when the skip_flag in the coding unit syntax is 0 and merge_flag in the prediction unit syntax is 1 is almost same as the procedure of generating a reconstructed block of a skipped coding unit. Specifically, the procedure of generating a prediction block is same as the procedure of generating a prediction block of a skipped coding unit. But, the residual block is not zero in the merge mode, a step for restoring a residual block and a step for generating a reconstructed block by adding the prediction block and the residual block are added.

Valid Spatial and temporal merge candidates are derived. The spatial merge candidates are the same as the spatial skip candidates. The temporal merge candidate is the same as the temporal skip candidate.

Next, a merge candidate list is constructed using valid merge candidates. The merge candidate list may be constructed in a predetermined order. The predetermined order is the order of a spatial left merge candidate (candidate A), a spatial above merge candidate (candidate B), a temporal merge candidate, a spatial above right merge candidate (candidate C) and a spatial below left merge candidate (candidate D), or in the order of a temporal merge candidate, a spatial left merge candidate (candidate A), a spatial above merge candidate (candidate B), a spatial above right merge candidate (candidate C) and a spatial below left merge candidate (candidate D).

When one or more of the candidates A, B, C, D are not available, a spatial above left merge candidate (candidate E) is added to the position of the unavailable candidate in the merge candidate list.

Also, the predetermined order may be changed or one or more merge candidates are excluded from the merge candidates according to a prediction mode of the prediction unit.

For example, if the prediction unit is 2N×N, the spatial below left merge candidate (candidate D) may be excluded. If the prediction unit is N×2N, the orders of the spatial below left merge candidate (candidate D) and the spatial upper right merge candidate (candidate C) are changed or the spatial upper right merge candidate (candidate C) is excluded.

Next, the motion vector and the reference picture index of the current prediction unit are derived. When there is a merge index in the received prediction unit, the motion vector and the reference picture index of the merge candidate indicated by the merge index are determined as the motion vector and the reference index of the current prediction unit.

When there is not a merge index in the received prediction unit and there exists a merge candidate, the motion vector and the reference picture index of the merge candidate are determined as the motion vector and the reference index of the current prediction unit.

When there is not a merge index in the received prediction unit and there does not exist at least one merge candidate, the motion vector and the reference index of the current prediction unit are set to 0.

When the merge index indicates the temporal merge candidate, the motion vector of the merge candidate block is determined as the motion vector of the current prediction unit and 0 or the reference picture index for the temporal merge candidate is determined as the reference picture index of the current prediction unit.

The merge index may have been coded using a VLC table determined by the number of the available merge candidates. If the merge index has been coded using a VLC table determined by the number of the available merge candidates, a step for counting the number of the available skip candidates and decoding the skip index using a VLC table corresponding to the number may be inserted.

If the motion vector and the reference picture index are derived, a prediction block is generated using the reference picture index and motion vector.

Also, a residual block is restored in the unit of transform units. The residual block is restored through entropy decoding, inverse scan, inverse quantization and inverse transform. The procedure is performed by the entropy decoding unit 210, the inverse scanning unit 215, the inverse quantization unit 220 and the inverse transform unit 225 of the decoding apparatus of FIG. 2.

Finally, a reconstructed block is generated using the prediction block and the residual block. The reconstructed block may be generated in the unit of coding units.

Figure 7:
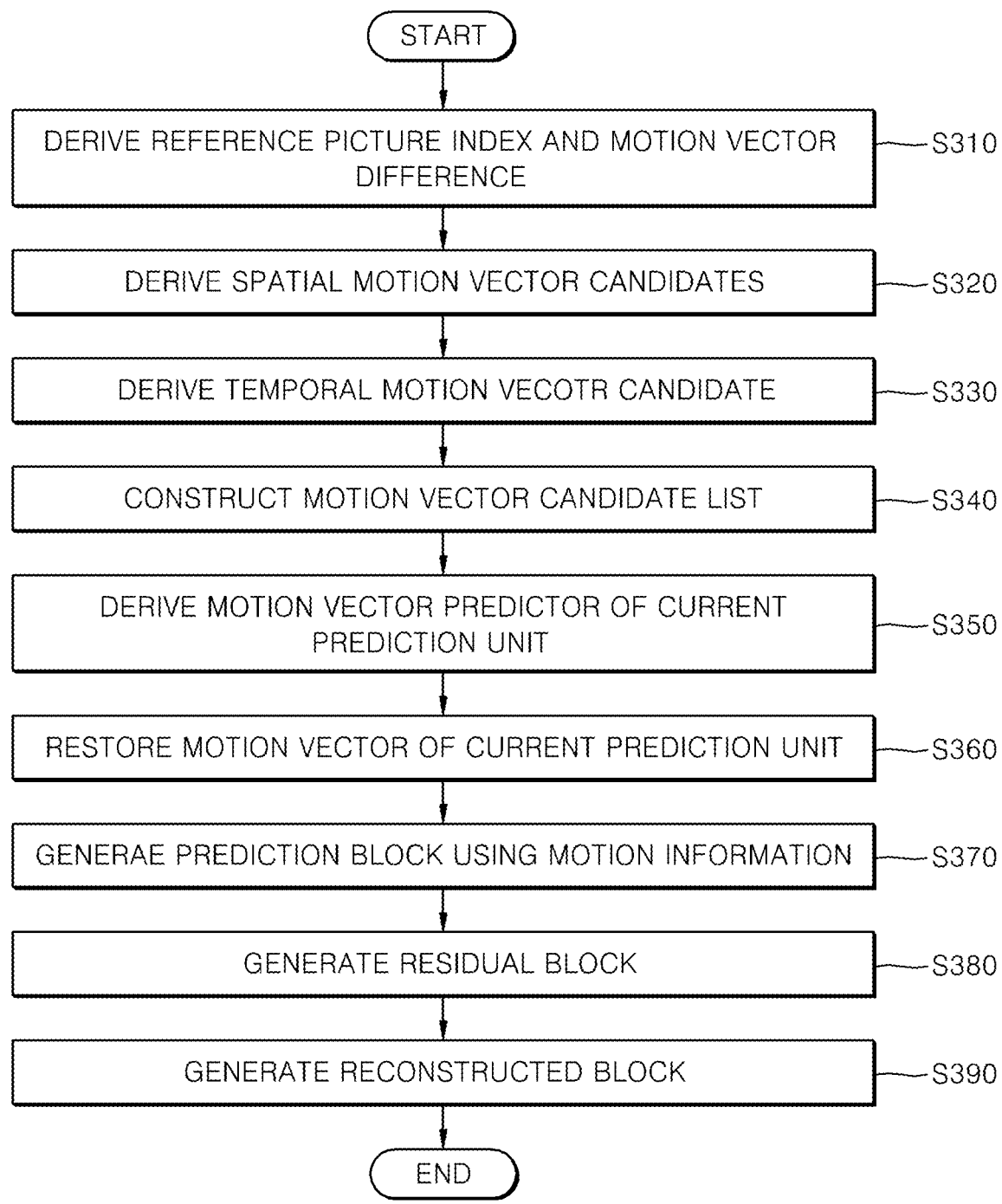
FIG. 7 is a flow chart illustrating a procedure of generating a reconstructed block when motion vector is predictively coded according to the present invention.

FIG. 7 is a flow chart illustrating a procedure of generating a reconstructed block when motion vector is predictively coded according to the present invention. When the skip_flag is 0 and the merge_flag is 0, this procedure is activated.

First, a reference picture index and a motion vector difference of a current prediction unit is obtained from a prediction unit syntax of the received bit stream (S310).

If slice type is B, inter prediction information is checked. If the inter prediction information indicates an uni-directional prediction (Pred_LC) using combined reference picture list, a reference picture is selected using the reference picture index among the reference pictures of the combined reference picture list (list_c), and the motion vector difference is restored. If the inter prediction information indicates an uni-directional prediction (Pred_L0) using reference picture list 0, a reference picture is selected using the reference picture index among the reference pictures of the reference picture list 0, and the motion vector difference is restored. If the inter prediction information indicates an bi-directional prediction (Pred_Bi), each reference picture is selected using each reference picture index among the reference pictures of each reference picture list, and each motion vector difference for each reference picture is restored.

Figure 8:
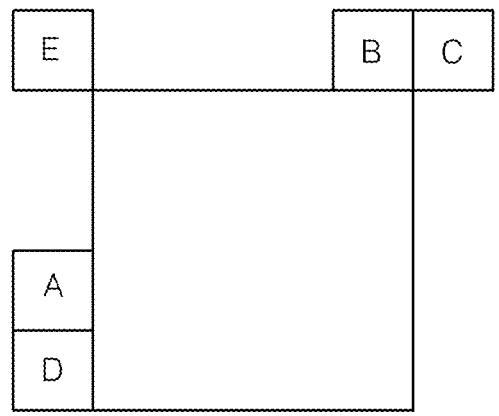
FIG. 8 is a conceptual diagram showing positions of neighboring prediction units used to generate motion vector candidates according to the present invention.

Next, spatial motion vector candidates are derived (S320). FIG. 8 is a conceptual diagram showing positions of neighboring prediction units used to generate motion vector candidates according to the present invention.

A spatial left motion vector candidate block may be one of left prediction units (blocks A and D) of a current block. A spatial above motion vector candidate block may be one of above prediction units (blocks B, C and E) of the prediction unit.

A procedure for deriving a spatial left motion vector candidate is as follows.

It is checked whether there is a prediction unit satisfying first conditions when retrieving the left blocks in the order of blocks A and D or in the order of blocks D and A. The first conditions are 1) there exists a prediction unit, 2) the prediction unit is inter-coded, 3) the prediction unit has same reference picture as that of the current prediction unit and 4) the prediction unit has same reference picture list as that of the current prediction unit. If there is a prediction unit satisfying the first conditions, the motion vector of the prediction unit is determined as the spatial left motion vector candidate. If not, it is checked whether there is a prediction unit satisfying second conditions. The second conditions are 1) there exists a prediction unit, 2) the prediction unit is inter-coded, 3) the prediction unit has same reference picture as that of the current prediction unit and 4) the prediction unit has different reference picture list from that of the current prediction unit. If there is a prediction unit satisfying the second conditions, the motion vector of the prediction unit is determined as the spatial left motion vector candidate. If not, it is checked whether there is a prediction unit satisfying third conditions. The third conditions are 1) there exists a prediction unit, 2) the prediction unit is inter-coded, 3) the prediction unit has different reference picture from that of the current prediction unit and 4) the prediction unit has same reference picture list as that of the current prediction unit. If there is a prediction unit satisfying the third conditions, the motion vector of the prediction unit is determined as the spatial left motion vector candidate. If not, it is checked whether there is a prediction unit satisfying fourth conditions. The fourth conditions are 1) there exists a prediction unit, 2) the prediction unit is inter-coded, 3) the prediction unit has different reference picture from that of the current prediction unit and 4) the prediction unit has different reference picture list from that of the current prediction unit. If there is a prediction unit satisfying the third conditions, the motion vector of the prediction unit is determined as the spatial left motion vector candidate.

The motion vector of the prediction unit satisfying the first conditions or the second conditions is not scaled. But, the motion vector of the prediction unit satisfying the first conditions or the second conditions is scaled.

If there is not a prediction unit satisfying any one conditions, the spatial left motion vector candidate is unavailable.

A procedure for deriving a spatial above motion vector candidate is as follows.

It is checked whether there is a prediction unit satisfying first conditions when retrieving the above blocks in the order of blocks B, C and E or in the order of blocks C, B and E. If there is a prediction unit satisfying the first conditions, the motion vector of the prediction unit is determined as the spatial above motion vector candidate. If not, it is checked whether there is a prediction unit satisfying the second conditions. If there is a prediction unit satisfying the second conditions, the motion vector of the prediction unit is determined as the spatial above motion vector candidate. If not, it is checked whether there is a prediction unit satisfying the third conditions. If there is a prediction unit satisfying the third conditions, the motion vector of the prediction unit is determined as the spatial above motion vector candidate. If not, it is checked whether there is a prediction unit satisfying the fourth conditions. If there is a prediction unit satisfying the fourth conditions, the motion vector of the prediction unit is determined as the spatial above motion vector candidate.

The motion vector of the prediction unit satisfying the first conditions or the second conditions is not scaled. But, the motion vector of the prediction unit satisfying the first conditions or the second conditions is scaled.

If there is not a prediction unit satisfying any one conditions, the spatial above motion vector candidate is unavailable.

A temporal motion vector candidate is derived (S330).

First, a reference picture which a temporal motion vector candidate block belongs to (a temporal skip candidate picture) is derived. A reference picture of index 0 may be determined as the temporal motion vector candidate picture. For example, a first reference picture of the reference picture list 0 is determined as the temporal motion vector candidate picture when the slice type is P. When the slice type is B, one reference picture list is selected using a flag of slice header indicating the temporal motion vector candidate picture and a first reference picture of the selected reference picture list is determined as the temporal motion vector candidate picture. Alternatively, a reference picture indicated by a reference picture index received from a prediction unit syntax is determined as the temporal motion vector candidate picture.

Next, a temporal motion vector candidate block is derived. The temporal motion vector candidate block is the same as the temporal skip candidate block. If the temporal motion vector candidate block is derived, the motion vector of the temporal motion vector candidate block is determined as the temporal motion vector candidate.

Next, a motion vector candidate list is constructed (S340). The motion vector candidate list is constructed using available spatial and temporal motion vector candidates. The motion vector candidate list may be constructed in a predetermined order. The predetermined order is the order of a spatial left motion vector candidate, a spatial above motion vector candidate and a temporal motion vector candidate, or the order of a temporal motion vector candidate, a spatial left motion vector candidate and a spatial above motion vector candidate.

The predetermined order may be changed or one or more motion vector candidates are excluded from the motion vector candidates according to a prediction mode of the prediction unit. For example, if the current prediction unit is a lower 2N×N prediction unit, the motion vector candidate of the upper prediction unit may be excluded. If the current prediction unit is a right N×2N prediction unit, the orders of the spatial above motion vector candidate and the spatial left motion vector candidate are changed or the spatial left motion vector candidate is deleted from the list.

Alternatively, when a coding unit is divided into two 2N×N prediction units, the motion information of the above 2N×N prediction unit may be encoded in merge mode. If the motion information of the above 2N×N prediction unit may not be encoded in merge mode, the block D may be deleted or blocks A and D are scanned in this order for the spatial left motion vector candidate. When a coding unit is divided into two N×2N prediction units, same method is applied for the above motion vector candidate.

Next, if a plurality of candidates have same motion vector, the candidate having lower priority is deleted in the motion vector candidate list.

Next, a motion vector predictor of the current prediction unit is obtained (S350).

When there is a motion vector index in the received prediction unit syntax, the motion vector candidate indicated by the motion vector index are determined as the motion vector predictor of the current prediction unit. When there is not a motion vector index in the received prediction unit syntax and there exists a motion vector candidate, the motion vector candidate is determined as the motion vector predictor of the current prediction unit. When there does not exist at least one motion vector candidate, the motion vector candidate is set to 0.

Meanwhile, prior to construction of the motion vector candidate list, the motion vector index maybe read. In this case, the number of valid motion vector to be retrieved is determined by the motion vector index. The motion vector index may be encoded in a fixed length or in a variable length.

If the motion vector predictor is obtained, a motion vector of the current prediction unit is generated by adding the motion vector difference and the motion vector predictor (S360).

Next, a prediction block is generated using the received reference picture index and the restored motion vector (S370).

Also, a residual block is restored in the unit of transform units (S380). The residual block is restored through entropy decoding, inverse scan, inverse quantization and inverse transform. The procedure is performed by the entropy decoding unit 210, the inverse scanning unit 215, the inverse quantization unit 220 and the inverse transform unit 225 of the decoding apparatus of FIG. 2.

Finally, a reconstructed block is generated using the prediction block and the residual block (S390). The reconstructed block may be generated in the unit of coding units.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A non-transitory recording medium which includes a bit stream decoded by an image decoding device, the bit stream being generated by dividing an image into a plurality of blocks and by performing intra prediction for the block and including:
   information indicating a size and an intra prediction mode of a current prediction block,
   information indicating a remaining quantization step size of a current coding block obtained by calculating difference between a quantization step size of the current coding block and a quantization step size predictor of the current coding block,
   information indicating one-dimensional (1D) quantized transform coefficients generated by scanning quantized transform coefficients of the quantized transform block,
   wherein the quantized transform block is generated by transforming a residual block, being obtained by calculating difference between the current prediction block and a prediction block corresponding to the current prediction block, being generated according to the intra prediction mode, and quantizing the transformed residual block using the quantization step size of the current coding block, wherein the image decoding device restores the intra prediction mode of the current prediction block and the 1D quantized transform coefficients from the bit stream, restores the quantized transform block by inversely scanning the 1D quantized transform coefficients, generates the quantization step size predictor, restores the quantization step size by adding the quantization step size predictor and the remaining quantization step size, and generates a transform block by inversely quantizing the quantized transform block using the quantization step size, restores a residual block by inversely transforming the transform block, generate the prediction block of the current prediction block according to the intra prediction mode, and generates an original block by adding the prediction block and the residual block, wherein a quantization step size of a previous coding block according to scan order is determined as the quantization step size predictor of the current coding block of which quantization step sizes of an above coding block and a left coding block of the current coding block are unavailable, and wherein the image decoding device inversely scans the quantized transform coefficients in a reverse direction.

* * * * *